June 19, 1962 H. A. PERKINS, JR 3,040,242

MAGNETIC AMPLIFIER SYSTEMS

Filed Feb. 13, 1957 3 Sheets-Sheet 1

WITNESSES

Leon J. Faga

Myron L. Click

INVENTOR

Harley A. Perkins, Jr.

BY F. E. Browder

ATTORNEY

June 19, 1962 H. A. PERKINS, JR 3,040,242

MAGNETIC AMPLIFIER SYSTEMS

Filed Feb. 13, 1957 3 Sheets-Sheet 2

June 19, 1962 H. A. PERKINS, JR 3,040,242

MAGNETIC AMPLIFIER SYSTEMS

Filed Feb. 13, 1957 3 Sheets-Sheet 3

United States Patent Office 3,040,242

Patented June 19, 1962

3,040,242

MAGNETIC AMPLIFIER SYSTEMS

Harley A. Perkins, Jr., Baldwin Township, Allegheny County, Pa., assignor to Westinghouse Electric Corporation, East Pittsburgh, Pa., a corporation of Pennsylvania Filed Feb. 13, 1957, Ser. No. 640,006

10 Claims. (Cl. 323—89)

This invention relates generally to magnetic amplifier systems and particularly to cascaded magnetic amplifier systems.

For certain applications, it is desirable that magnetic amplifiers be cascaded. Theoretically, if perfectly square hysteresis loop magnetic core material and zero reverse leakage rectifiers are used, in magnetic amplifier systems incorporating voltage reset means, the output from the saturable reactors therein is a function of the amount of the reset applied to the saturable reactors by the reset windings. A signal introduced into the input of such a cascaded magnetic amplifier system will tend to block the reset voltage of the first stage at the reset rectifier, if the magnitude of the input signal, at any particular time, is larger than that of the reset voltage. Therefore, the reset is removed from the saturable reactor of the first stage and on the next half-cycle the gating supply voltage will produce a full output when the output winding turns are just sufficient to drive the magnetic core through a flux change of twice the saturation flux density with a given gating supply voltage. By proper design, the output from the first stage of a cascaded magnetic amplifier system can be made large enough in magnitude to block the reset voltage of the second stage. By so doing, there is a full output subject to the conditions above from the second stage in the same manner as from the first stage. This is repeated through N stages of the cascaded magnetic amplifier system.

Practically, perfect square hysteresis loop magnetic core material can be approached but never achieved with present magnetic core fabrication methods and processes. The residual flux density $B_r$ of present magnetic core material is less than the maximum flux density $B_m$. Therefore, the saturable reactor of the first stage is not completely saturated for the entire gating half-cycle. Rectifiers with zero reverse leakage are also unavailable. This reverse leakage of the rectifiers further modifies the state of flux in the magnetic core during the reset half cycle. As a result, a signal applied to the input of a cascaded magnetic amplifier system will produce at the output of the first stage, a conduction angle that is less than the conduction angle of the input signal.

The "conduction angle" referred to herein is defined as that portion of a gating half-cycle during which a saturable reactor is saturated and allows conduction to the rest of the circuit.

An additional attenuation in conduction angle is added by each stage, so that after a sufficient number N stages an output might not appear at all.

Conduction angle attenuation requires that present manufacturing of cascaded magnetic amplifier systems be based upon holding the characteristics of magnetic core materials and rectifiers to an optimum quality obtainable in order to produce a usable system. Even with such quality control, some circuits, such as ringing circuits and holding circuits in logic design, are still troublesome because of this successive stage attenuation of the output conduction angle.

An object of this invention is to provide an improved cascaded magnetic amplifier system.

Another object of this invention is to provide an improved cascaded magnetic amplifier system which assures that the output of N cascaded stages will be the same as if the Nth stage were the first stage.

A further object of this invention is to provide an improved cascaded magnetic amplifier system, performance of which is not dependent upon high quality rectifiers nor upon an extremely high ratio of residual flux density $B_r$ to the maximum flux density $B_m$ in the magnetic cores of the saturable reactors.

Further objects of this invention will become apparent from the following description when taken in conjunction with the accompanying drawings. In said drawings, for illustrative purposes only, are shown preferred forms of the invention.

FIGURE 1 is a schematic diagram of a cascaded magnetic amplifier system, illustrating the teachings of this invention, showing two stages of amplification and a common power supply;

FIG. 1*a* is a representation of waveforms present in the different branches of the system shown in FIG. 1 when the power supply is omitted;

FIG. 1*b* is a representation of waveforms present in the different branches of the system shown in FIG. 1;

Figures 1, 1A, 1B:
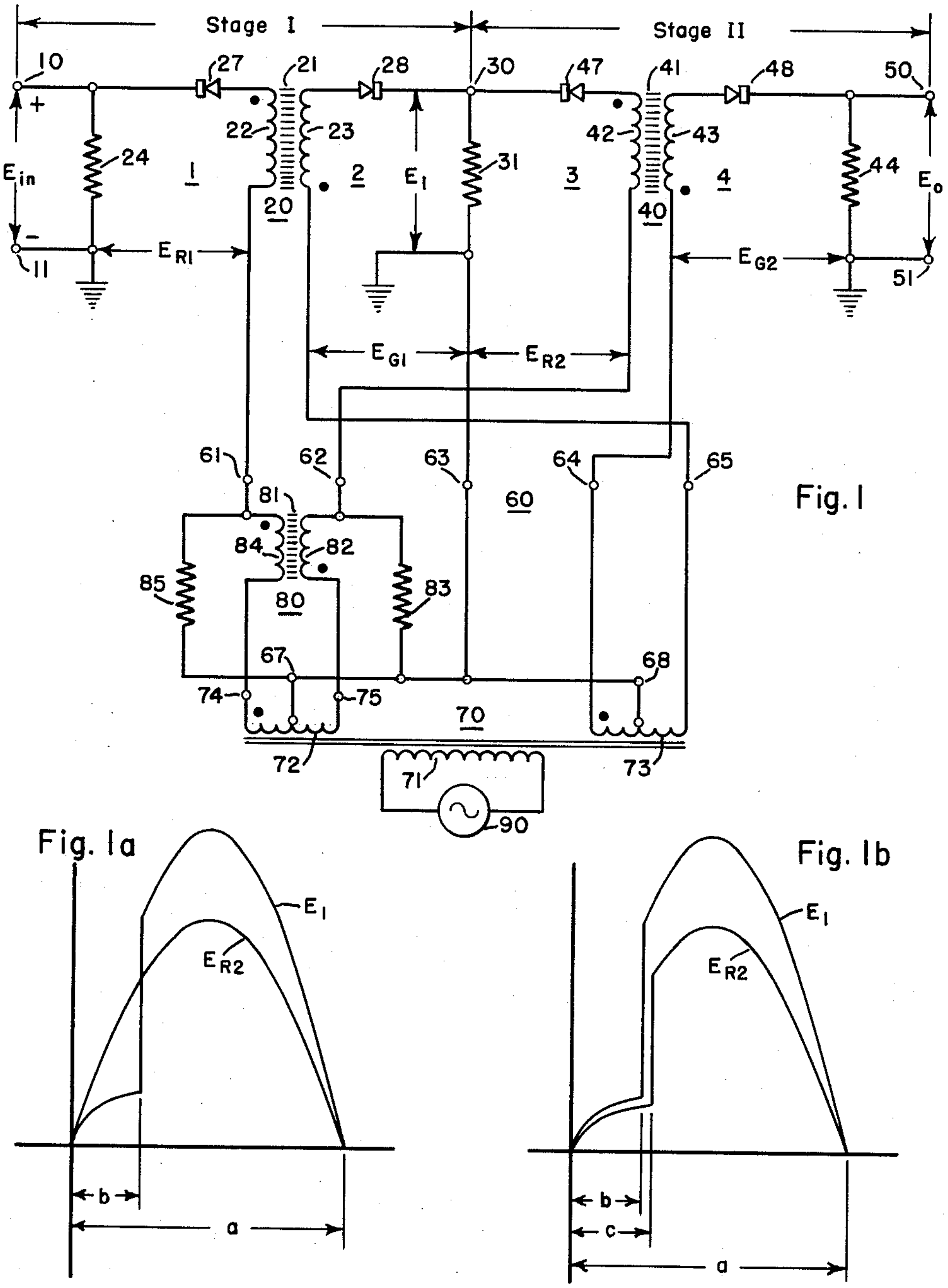

Referring to FIG. 1, there is illustrated two stages of a cascaded magnetic amplifier system having a common power supply. In general, the system comprises a first stage magnetic amplifier 20, having input terminals 10 and 11. The ouput from the magnetic amplifier 20 is connected to control a second stage magnetic amplifier 40. The output of the magnetic amplifier 40 appearing at terminals 50 and 51 constitutes the output portion of the illustrated system. A common power supply for the system is designated generally at 60.

The first stage magnetic amplifier 20 comprises a control-reset circuit 1 and a load-output circuit 2. The control-reset circuit 1 includes a reset winding 22, a rectifier 27 and resistor 24 connected in series circuit relationship between power supply terminal 61 and a suitable ground. The input signal is applied to terminals 10 and 11 across resistor 24. The load-output circuit 2 includes gating winding 23 and rectifier 28 connected in series circuit relationship between power supply terminal 65 and terminal 30. Terminal 30 is connected to a suitable ground through a resistor 31. Reset winding 22 and gating winding 23 are disposed in inductive relationship with a magnetic core member 21.

The second stage magnetic amplifier 40 comprises a control-reset circuit 3 and a load-output circuit 4. The control-reset circuit 3 includes a reset winding 42 and rectifier 47 connected in series circuit relationship between power supply terminal 62 and terminal 30. The load-output circuit 4 includes gating finding 43, rectifier 48 and resistor 44 connected in series circuit relationship between power supply terminal 64 and a suitable ground. Reset winding 42 and gating winding 43 are disposed in inductive relationship with magnetic core member 41. The output of the system appears across resistor 44 at terminals 50 and 51.

The power supply 60 is connected to a suitable alternating-current voltage source 90 through a primary winding 71 of a transformer 70. A secondary winding 73 of the transformer 70 supplies alternating-current voltage to gating windings 23 and 43 and hence will be called the gating secondary winding. A secondary winding 72 of the transformer 70 supplies alternating-current voltage to reset windings 22 and 42 and hence will be called the reset secondary winding.

Gating secondary winding 73 is connected to power supply terminals 64 and 65 and has a center tap 68 which is connected to a grounded power supply terminal 63. The terminal 75 of reset secondary winding 72 is connected through a winding 82 of a saturable reactor 80 to power supply terminal 62. An exciting current resistor 83 is connected between a center tap 67 of reset secondary winding 72 and the power supply terminal 62. Terminal 74 of reset secondary winding 72 is connected through a winding 84 of the saturable reactor 80 to the power supply terminal 61. An exciting current resistor 85 is connected between a center tap 67 of reset secondary winding 72 and the power supply terminal 61. The center tap 67 is connected to the power supply terminal 63. The windings 82 and 84 of the saturable reactor 80 are disposed in inductive relationship with a magnetic core member 81.

The operation of the first stage magnetic amplifier 20 can be divided into two portions, the gating portion of the supply voltage as applied to power supply terminal 65 and thus to the gating winding 23, and the reset portion of the supply voltage as applied to power supply terminal 61 and thus to reset winding 22. That is, during one half-cycle of supply voltage when power supply terminal 65 is at a positive polarity with respect to ground, the gating portion of operation takes place, and during the next half-cycle when the power supply terminal 61 is at a positive polarity with respect to ground, the reset portion of operation takes place. The operation of the second stage magnetic amplifier 40 can also be divided into two similar portions, the gating portion of supply voltage as applied to power supply terminal 64 and thus to gating winding 43, and the reset portion of the supply voltage as applied to power supply terminal 62 and thus to reset winding 42. That is, during one half-cycle of the supply voltage when power supply terminal 64 is at a positive polarity with respect to ground the gating portion of operation takes place and during the next half-cycle when power supply terminal 62 is at a positive polarity with respect to ground the reset portion of operation takes place.

For the proper operation of the cascaded magnetic amplifier system shown in FIG. 1, it is to be noted that the gating portion of the first stage magnetic amplifier 20 takes place on the same half-cycle of the supply voltage as the reset portion of the second stage magnetic amplifier 40 for reasons explained hereinafter.

Referring again to the first stage magnetic amplifier 20; during the gating portion of the supply voltage, when power supply terminal 65 is at a positive polarity with respect to ground, exciting current flows from terminal 65 through gating winding 23, rectifier 28, terminal 30 and resistor 31 to a suitable ground. The load-output circuit 2 is designed to deliver only a sufficient number of volt-seconds over the half-cycle of operation to drive magnetic core member 21 just to positive saturation. Therefore, the output across resistor 31, designated as $E_1$, during this gating half-cycle of operation would be zero.

The function of gating rectifier 28 is two-fold, namely, to prevent a reset of magnetic core member 21 by the reverse flow of current on the next half-cycle and to isolate the gating winding 23 of the first stage magnetic amplifier 20 from the control-reset circuit 3 of the second stage magnetic amplifier 40.

During the next half-cycle, when power supply terminal 61 is at a positive polarity with respect to ground, exciting current flows from terminal 61 through reset winding 22, rectifier 27 and resistor 24 to a suitable ground. The control-reset circuit 1 is designed to deliver only a sufficient number of volt-seconds over the half-cycle of operation to drive magnetic core member 21 just to negative saturation.

The function of reset rectifier 27 is two-fold, namely, to prevent a reverse flow of current on the next half-cycle through reset winding 22 from presetting the flux condition in magnetic core member 21 and to isolate reset winding 22 from the input circuit.

This control-reset circuit 1 will function in the above described manner on every reset half-cycle when power supply terminal 61 is at a positive polarity with respect to ground, and there is no input signal at terminals 10 and 11. Therefore, on succeeding alternate half-cycles, the load-output circuit 2 will consume all the volt-seconds delivered in again bringing magnetic core member 21 to saturation and again there will be no output $E_1$ from the first stage. However, an input signal to terminals 10 and 11 during the reset half-cycle of control-reset circuit 1, that is at any instant larger than the designated reset voltage $E_{R1}$, will block this reset voltage $E_{R1}$ at rectifier 27. The control-reset circuit 1 then will not operate to resaturate the magnetic core member 21 in the opposite polarity. Therefore, on the next succeeding half-cycle, the magnetic core member 21 will still be substantially completely saturated, gating winding 23 will approximate zero impedance and an output $E_1$ will appear at terminal 30 across resistor 31 to ground. This output from the first stage magnetic amplifier 20 will continue to appear on every gating half-cycle, that is, when power supply terminal 65 is at a positive polarity with respect to ground, as long as a signal of sufficient magnitude, to block the reset voltage $E_{R1}$, is present at input terminals 10 and 11 during the preceding reset half-cycle.

Referring now to the second stage magnetic amplifier 40; during the gating portion of supply voltage when power supply terminal 64 is at a positive polarity with respect to ground, exciting current from power supply terminal 64 flows through gating winding 43, rectifier 48 and resistor 44 to a suitable ground. The load-output circuit 4 is designed to deliver only a sufficient number of volt-seconds over the half-cycle of operation to saturate magnetic core member 41 as discussed. Therefore, the output $E_0$ across resistor 44 to output terminals 50 and 51 during this half-cycle would be zero.

The function of gating rectifier 48 is two-fold, namely, to prevent a reset of magnetic core member 21 by a reverse flow of current on the next half-cycle and to isolate gating winding 43 from the output circuit.

During the next half-cycle of supply voltage, when power supply terminal 62 is at a positive polarity with respect to ground, exciting current from terminal 62 flows through reset winding 42, rectifier 47, terminal 30 and resistor 31 to ground. The control-reset circuit 3 is designed to deliver only a sufficient number of volt-seconds over the half-cycle of operation of resaturate magnetic core member 41 as discussed.

The function of reset rectifier 47 is two-fold, namely, to prevent a reverse flow of current from presetting the flux conditions in magnetic core member 41 and to isolate reset winding 42 from the load-output circuit 2 of magnetic amplifier 20.

The control-reset circuit 3 will function in the above-described manner on every reset half-cycle, that is, when power supply terminal 62 is at a positive polarity with respect to ground. Therefore, on succeeding alternate half-cycles, the load-output circuit 4 will consume all the volt-seconds delivered in again bringing magnetic core member 41 to saturation and again there will be no output voltage $E_0$ at terminals 50 and 51 across resistor 44.

It was noted above that control-reset circuit 3 of second stage magnetic amplifier 40 is operating on the same half-cycle of supply voltage as the load-output circuit 2 of the first stage of magnetic amplifier 20. Therefore, if output voltage $E_1$ from the load-output circuit 2 of the first stage magnetic amplifier 20 appears at terminal 30 across resistor 31, it will be, by design, of sufficient magnitude at any instant to block the reset voltage of control-reset circuit 3, designated $E_{R2}$, at rectifier 47. The control-reset circuit 3 then will not operate to resaturate magnetic core member 41. Accordingly, on the next succeeding half-cycle, the magnetic core member 41 will still be substantially completely saturated, gating winding 43 will approximate zero impedance and an output $E_0$ will appear at terminals 50 and 51 across resistor 44.

The operation of power supply 60 can be divided into two portions, the supplying of gating voltages $E_{G1}$ and $E_{G2}$ to load-output circuits 2 and 4 of magnetic amplifiers 20 and 40 by the secondary winding 73 of transformer 70 from primary winding 71 which is connected to a suitable alternating-current voltage source 90, and the supplying of reset voltages $E_{R1}$ and $E_{R2}$ through saturable reactor 80 to the control-reset circuits 1 and 3 of magnetic amplifiers 20 and 40 by the secondary winding 72 of the transformer 70 from the primary winding 71 which is connected to the alternating-current voltage source 90.

Referring to the gating secondary winding 73 of the transformer 70; during one-half cycle of alternating-current voltage source 90, power supply terminal 64 is at positive polarity with respect to the center tap 68 and power supply terminal 65 is at negative polarity with respect to the center tap 68. During the next half-cycle of the alternating-current voltage source 90, the power supply terminal 65 is at positive polarity with respect to the center tap 68 and the power supply terminal 64 is at negative polarity with respect to the center tap 68.

Referring to the reset secondary winding 72 of the transformer 70, during the one-half cycle of the alternating-current voltage source 90, the terminal 74 is at positive polarity with respect to the center tap 67. Exciting current flows from the terminal 74 through the winding 84 of the saturable reactor 80 to the power supply terminal 61. The resistor 85 provides a return path for exciting current to the center tap 67 when the power supply 60 is lightly loaded. During the next half-cycle of the alternating current voltage source 90, the terminal 75 is at positive polarity with respect to the center tap 67. The exciting current flows from the terminal 75 through the winding 82 to the power supply terminal 62. The resistor 83 provides a return path for the exciting current to the center tap 67 when the power supply 60 is lightly loaded.

The windings 82 and 84 of the saturable reactor 80 are disposed in inductive relationship with the magnetic core member 81. The windings 82 and 84 of the saturable reactor 80 are of equal turns and are designed to absorb an average voltage which is some predetermined portion of the reset voltages $E_{R1}$ and $E_{R2}$ designated in FIG. 1.

An examination of the waveforms present in different branches of the cascaded magnetic amplifier system will clarify operation of the power supply 60. If the saturable reactor 80 were omitted from the power supply 60, the reset voltage $E_{R2}$ for the control-reset circuit 3 would be as illustrated in FIG. 1*a*, assuming a sinusoidal alternating-current voltage for the source 90 although non-sinusoidal alternating-current voltage may be used with corresponding changes in the output waveform. The output voltage $E_1$ of the first stage magnetic amplifier 20 would appear as illustrated in FIG. 1*a*, because of the characteristics of the magnetic core materials and rectifiers as hereinbefore explained. Thus, with an output voltage $E_1$ conduction angle of $(a-b)$ and a reset voltage $E_{R2}$ conduction angle of $(a)$, where $a=180°$, it is apparent that the output voltage $E_1$ of the magnetic amplifier 20 will not block the reset voltage $E_{R2}$ of the control-reset circuit 3 over the full half-cycle. As a result, the magnetic amplifier 40 will be reset to some degree and on the next half-cycle an additional attenuation in the output conduction angle will appear in the output of the magnetic amplifier 40.

With the saturable reactor 80 included in the power supply 60, the output voltage $E_1$ of the magnetic amplifier 20 would appear as illustrated by the waveforms of FIG. 1*b*. The windings 82 and 84 of the saturable reactor 80 are designed, as described above, to absorb some average portion of the reset voltages $E_{R1}$ and $E_{R2}$. That is, the windings 82 and 84 are designed to have a conduction angle of $(a-c)$ which is equal to or smaller than the conduction angle $(a-b)$ of any voltage presented to the control-reset circuit rectifiers 27 and 47. This would be the voltage $E_1$, the output of the first stage magnetic amplifier 20. Therefore, the reset voltage of every stage can be blocked over the full half-cycle of reset operation and the output of that stage will show no additional attenuation in conduction angle.

Figure 2:
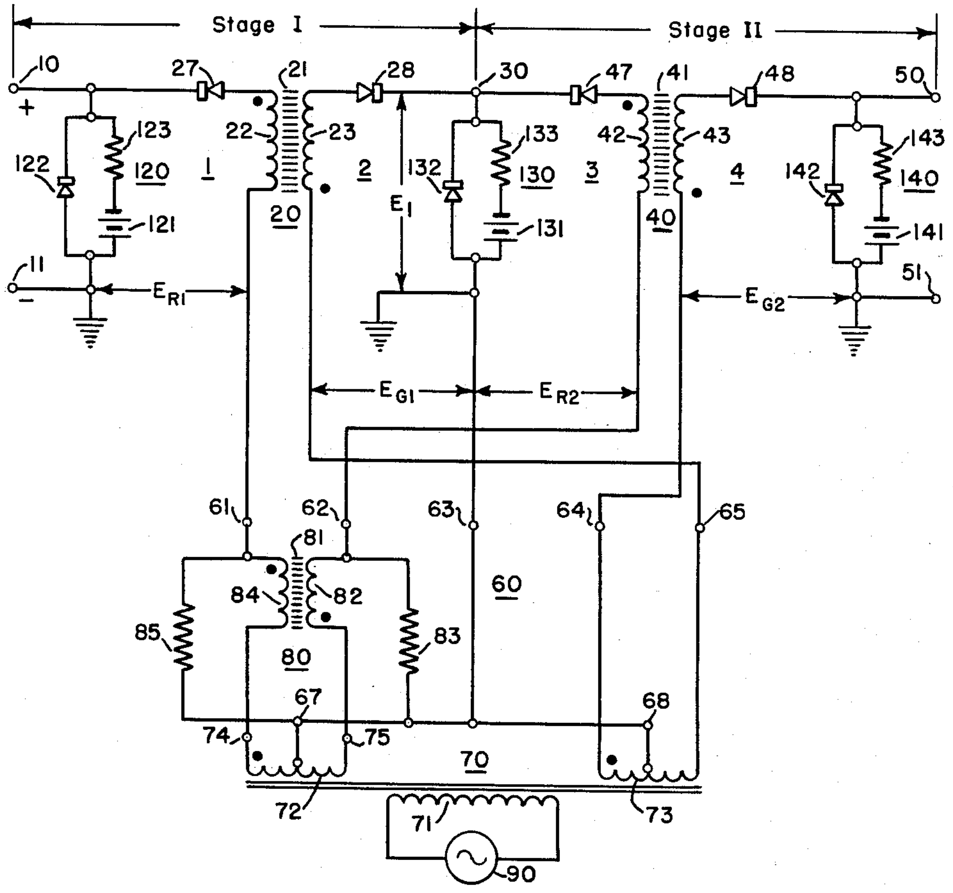
FIG. 2 is a schematic diagram of a second embodiment of the invention illustrated in FIG. 1.

Referring to FIG. 2, there is illustrated another embodiment of the teachings of this invention, in which like components of FIGS. 1 and 2 have been given the same reference characters. The main distinction between the apparatus illustrated in FIGS. 1 and 2 is that in FIG. 2 non-linear resistance circuits 120, 130, and 140 have been substituted for resistors 24, 31 and 44, respectively of FIG. 1.

The non-linear resistance circuit 120 comprises a suitable direct current bias source 121 with polarity as shown, a rectifier 122 and a resistor 123. The non-linear resistance circuit 120 serves as a coupling between any suitable input to the system and the first stage magnetic amplifier 20. The non-linear resistance circuit 130 comprises a suitable direct current bias source 131 with polarity as shown, a rectifier 132 and a resistor 133. The non-linear resistance circuit 130 serves as a coupling between the first stage magnetic amplifier 20 and the second stage magnetic amplifier 40. The non-linear resistor circuit 140 comprises a suitable direct current bias source 141 with polarity as shown, a rectifier 142 and a resistor 143. The non-linear resistor circuit 140 serves as a coupling between the second stage magnetic amplifier 40 and a suitable output circuit.

In general, the operation of the cascaded magnetic amplifier system illustrated in FIG. 2 is similar to the operation of the system shown in FIG. 1. However, the addition of the non-linear resistance circuits 120, 130, and 140 couplings serve two purposes, as follows:

(1) A non-linear resistance circuit presents a low impedance in series with the reset voltage in order to reset the core completely with the reset voltage $E_{R1}$ when an input from the preceding or driving stage is absent.

(2) A nonlinear resistance circuit presents a high impedance to provide the least loading of the preceding or driving stage when an input signal is present from the preceding or driving stage.

Since the remaining operation of the apparatus illustrated in FIG. 2 is similar to the operation of the apparatus of FIG. 1, a further description of such operation is deemed unnecessary.

Figure 3:
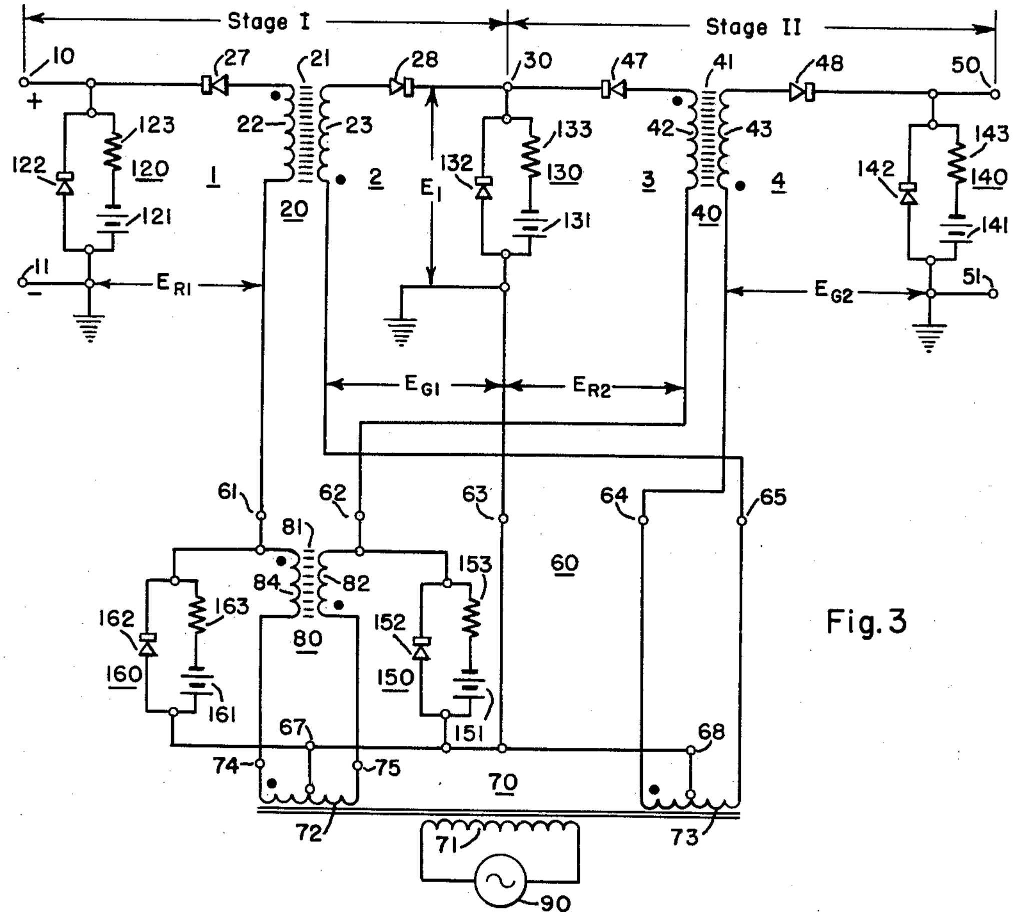
FIG. 3 is a schematic diagram of a third embodiment of the invention illustrated in FIG. 1; and, FIG. 3*a* is a representation of waveforms present in the different branches of the system shown in FIG. 3.

Referring to FIG. 3, there is illustrated still another embodiment of this invention in which like components of FIGS. 2 and 3 have been given the same reference characters. The main distinction between the apparatus illustrated in FIGS. 2 and 3 is that in the apparatus of FIG. 3 non-linear resistance circuits 150 and 160 have been substituted for the exciting current resistors 83 and 85, respectively of FIGS. 1 and 2.

Figure 3A:
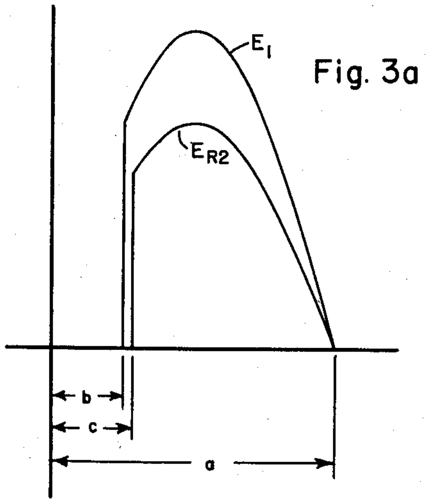

The non-linear circuit 150 comprises a suitable direct current bias source 151 with polarity as shown, a rectifier 152 and resistor 153. In non-linear resistance circuit 150, the direct current bias is from a high voltage source. Current flows from the positive terminal of the direct current bias source 151 through the rectifier 152 in the forward direction and the resistance 153 to the negative terminal of the direct current bias source. This current is maintained at a low and nearly constant level by a resistor 153. The exciting current for the winding 82 flows from the terminal 75 through the winding 82 to the power supply terminal 62. The current flowing in the non-linear resistance circuit 150 from the direct current bias source 151 through the rectifier 152 is made larger than the peak value of the exciting current flowing in the winding 82. As long as the exciting current flowing in the winding 82 does not attempt to exceed the current from the direct current bias source 151, the principle of superposition is applicable and the exciting current of the winding 82 is, in effect, allowed to flow through the rectifier 152 in the reverse direction and thus to the center tap 67. The resulting waveform $E_{R2}$ is shown in FIG. 3*a*. Its conduction angle is $(a-c)$. For the interval $(c)$ there is no conduction of the exciting current of the winding 82 to the control-reset circuit 3, since it is returning to the center tap 67 through non-linear resistance circuit 150. When the winding 82 is saturated, the current through the winding surpasses the value of the current in non-linear circuit 150 and thereafter is diverted to control-reset circuit 3.

The non-linear circuit 160 is comprised of a suitable direct current bias source 161 with polarity as shown, a rectifier 162 and a resistor 163. The operation of non-linear resistance circuit 160 is the same for the reset voltage $E_{R1}$ as the operation of non-linear resistance circuit 150 for reset voltage $E_{R2}$. Since the remaining operation of the apparatus illustrated in FIG. 3 is similar to that of the system illustrated in FIG. 2, a further description of such operation is deemed unnecessary.

The cascaded magnetic amplifier systems embodying the teachings of this invention have several advantages. There is no successive stage attenuation of the output conduction angle, making possible circuits in logic design to heretofore practical. The maximum output of the Nth stage of amplification in a cascaded magnetic amplifier system is determined only by the characteristics of the Nth stage itself. This invention allows use of magnetic core materials with lower ratios of residual flux density $B_r$ to maximum flux density $B_m$ than those presently in use. This invention indicates possible future use of thicker laminates or stacked magnetic cores. Less rigid control of core annealing processes are required. Since the reset voltages delivered by $E_{R1}$ and $E_{R2}$ are used only to supply iron losses to saturable reactors, the total power supplied is small, permitting the use of a small reactor for the saturable reactor 80. The output of this novel power supply is affected only by ordinary regulation drop. The waveform remains relatively unchanged over large load variations.

In conclusion, it is pointed out that while the illustrated examples constitute practical embodiments of my invention, I do not limit myself to the exact details shown, since modification of the same may be varied without departing from the spirit of this invention defined in the appended claims.

I claim as my invention:

1. In a magnetic amplifier system, in combination, a plurality of magnetic amplifier stages, each including input and output means, saturable means, load-output circuit means adapted to saturate said saturable means, control-reset circuit means including a control-reset winding and a rectifier serially connected and adapted to reset said saturable means, coupling means connecting the input of each successive stage to the output of the preceding stage, output means for the system, power supply means for supplying alternating current voltages to each said load-output circuit means and each said control-reset circuit means of said plurality of stages, power supply saturable means connected to each said control-reset winding whereby the conduction angle of said alternating-current voltage in said control-reset circuit means is limited to the same portion of each half cycle of said alternating current voltage as the load output circuit means of the preceding stage, and means providing exciting current for said power supply saturable means.

2. In a magnetic amplifier system, in combination, a plurality of magnetic amplifier stages each including input means, a saturable core, a load-output winding, a control-reset winding, rectifier means serially connected with said load-output winding for causing unidirectional current flow in said load-output winding tending to saturate said saturable core, rectifier means serially connected with said control-reset winding for causing unidirectional current flow in said control-reset winding tending to desaturate said saturable core, means for limiting current flow in said load-output and control-reset windings, coupling means connecting the input of each successive stage to the output of the preceding stage, an output means for the system, power supply means, said power supply means comprising means for supplying alternating current voltage to said load-output windings and said control-reset windings, said power supply means comprising a saturable reactor connected to said alternating current voltage for limiting conduction of the alternating-current voltage in said control-reset windings to the same portion of each half cycle of the alternating current voltage as the load-output winding of the preceding stage, and means providing exciting current for said power supply saturable reactor.

3. In a magnetic amplifier system, in combination, a plurality of magnetic amplifier stages each having input means, a saturable core, a load-output winding, a control-reset winding, rectifier means serially connected with said load-output winding for causing unidirectional current flow in said load-output winding tending to saturate said saturable core, rectifier means serially connected with said control-reset winding for causing unidirectional current flow in said control-reset winding tending to desaturate said saturable core, means for limiting current flow in said load-output and control reset windings, coupling resistors connecting the input of each successive stage to the output of the preceding stage, an output means for the system, and a power supply for said plurality of stages, said power supply comprising a saturable reactor, and means for applying alternating-current voltage to said load output windings and said control-reset windings, said saturable reactor connected to each said control-reset winding and limiting conduction of said alternating-current voltage in said control-reset windings to the same portion of each half cycle as in the load output winding of the preceding stage, and means providing exciting current for said power supply saturable reactor.

4. In a magnetic amplifier system, in combination, a plurality of magnetic amplifier stages each having input means, a saturable core, a load-output winding, a control-reset winding, rectifier means serially connected with said load-output winding for causing unidirectional current flow in said load-output winding tending to saturate said saturable core, rectifier means serially connected with said control-reset winding for causing unidirectional current flow in said control-reset winding tending to desaturate said saturable core, means for limiting current flow in said load-output and control-reset winding, non-linear resistance means coupling the input of each successive stage to the output of the preceding stage, a power supply for said plurality of stages, said power supply for said load-output windings and for said control-reset windings comprising means for applying an alternating-current voltage to said windings, a saturable reactor connected to each said control-reset winding for limiting conduction of said alternating-current voltage in said control-reset windings to the same portion of each half-cycle as in said load output winding of the preceding stage, and means providing exciting current for said power supply saturable reactor.

5. In a magnetic amplifier system, in combination, a plurality of magnetic amplifier stages each having input means, a saturable core, a load-output winding, a control-reset winding, rectifier means serially connected with said load-output winding for causing unidirectional current flow in said load-output winding tending to saturate said saturable core, rectifier means serially connected with said control-reset winding for causing unidirectional current flow in said control-reset winding tending to desaturate said saturable core, means for limiting current flow in said load-output and control-reset winding, nonlinear means coupling the input of each successive stage to the output of the preceding stage, a power supply for said plurality of stages, said power supply for said load-output windings and for said control-reset windings comprising means for applying an alternating-current voltage to said windings, a saturable reactor connected to each said control-reset winding for limiting conduction of said alternating-current voltage in said control-reset windings to the same portion of each half-cycle as in said load output winding of the preceding stage, and means providing exciting current for said power supply saturable reactor.

6. In a magnetic amplifier system, in combination, a plurality of magnetic amplifier stages, each having input means, a saturable core, a load output winding, a control-reset winding, rectifier means serially connected with said load-output winding for causing unidirectional current flow in said load-output winding tending to saturate said saturable core, rectifier means serially connected with said control-reset winding for causing unidirectional current flow in said control-reset winding tending to desaturate said saturable core, means for limiting current flow in said load-output and control-reset circuit, non-linear resistance means coupling the input of each successive stage to the output of the preceding stage, an output means for the system, a power supply for said plurality of stages, said power supply for said load-output windings and for said control reset windings of said plurality of stages comprising means for applying an alternating-current voltage to said load output windings and said control-reset windings, a saturable reactor connected to each said control-reset winding for limiting conduction of said alternating-current voltage in said control-reset windings to match the conduction of said alternating current voltage in the load output winding of the preceding stage, and a resistance means providing exciting current for said power supply saturable reactor.

7. In a magnetic amplifier system, in combination, a plurality of magnetic amplifier stages, each having an input means, a saturable core, a load output winding, a control-reset winding, rectifier means serially connected to said load-output winding for causing unidirectional current flow in said load-output winding tending to saturate said saturable core, rectifier means serially connected to said control reset winding for causing unidirectional current flow in said control-reset winding tending to desaturate said saturable core, means for limiting current flow in said load-output and control-reset windings, non-linear resistance means coupling the input of each successive stage to the output of the preceding stage, said means including a unidirectional current device and resistance means and means for providing a direct current voltage bias to said non-linear resistance means, an output means for the system, a power supply for said plurality of stages, said power supply for said load-output windings and for said control-reset windings comprising means for applying an alternating-current voltage to said load-output windings and said control-reset windings, a saturable reactor connected to said control-reset windings for limiting conduction of said alternating-current voltage source in said control-reset windings to match the conduction of said alternating current voltage in the load output winding of the preceding stage, and a non-linear resistance circuit means and means for applying a direct current voltage bias to said non-linear resistance circuit means to control excitation of said control-reset windings.

8. In a power supply for a magnetic amplifier system comprising a plurality of stages, in combination, means for applying an alternating-current voltage for load-output circuits and for control-reset circuits of said plurality of stages, each said control-reset circuit including a control-reset winding and a rectifier means serially connected, saturable means connected to each said control-reset circuit only whereby conduction of said alternating-current voltage in said control-reset circuits is limited to the same portion of each half-cycle as the conducting portion of said alternating current voltage in the load output circuit of the preceding stage, and means providing exciting current for said saturable means.

9. In a power supply for a magnetic amplifier system with a plurality of stages, in combination, means for applying an alternating-current voltage for load-output circuits and for control-reset circuits of said plurality of stages, each said control-reset circuit including a control-reset winding serially connected with a rectifier means, a saturable reactor connected to each said control-reset circuit only for limiting conduction of said alternating-current voltage in said control-reset circuits to the same portion of each half-cycle as the conducting portion of said alternating current voltage in the load output circuit of the preceding stage, and a means providing exciting current for said saturable reactor.

10. A magnetic amplifier system having a plurality of stages each having an input means, a saturable core, a load-output winding, a control-reset winding, a unidirectional current device connected in series with each load-output winding to maintain core saturating current in each said load-output winding unidirectional, a unidirectional current device connected in series with each control-reset winding to provide unidirectional current in each said control-reset winding, and tends to desaturate said saturable core, the control-reset circuit of each successive stage being so connected to the load-output circuit of the preceding stage that an input signal to the first stage results in an output signal from the last stage, a power supply means for said plurality of stages, said power supply means providing alternating current voltage to control-reset circuits only including said control-reset windings of said plurality of stages over only a portion of each half-cycle of said alternating-current voltage, said portion being substantially the same as the conducting portion of said alternating current voltage in the load output winding of the preceding stage.

References Cited in the file of this patent

UNITED STATES PATENTS

| | | |
|---|---|---|
| 2,423,114 | Potter | July 1, 1947 |
| 2,683,843 | Geyger | July 13, 1954 |
| 2,686,287 | Gerg | Aug. 10, 1954 |
| 2,734,165 | Lufcy et al. | Feb. 7, 1956 |
| 2,766,420 | Ramey | Oct. 9, 1956 |
| 2,802,166 | Sanderlin et al. | Aug. 6, 1957 |
| 2,836,784 | Gross | May 27, 1958 |